(12) United States Patent  (10) Patent No.: US 7,434,769 B1
May  (45) Date of Patent: Oct. 14, 2008

(54) ARTICULATED CHANNEL ARM

(75) Inventor: Richard L. May, Hardwick, MA (US)

(73) Assignee: O.C. White Co., Hardwick, MA (US)

( * ) Notice: Subject to any disclaimer, the term of this patent is extended or adjusted under 35 U.S.C. 154(b) by 830 days.

(21) Appl. No.: 10/873,963

(22) Filed: Jun. 22, 2004

Related U.S. Application Data

(60) Provisional application No. 60/505,298, filed on Sep. 23, 2003.

(51) Int. Cl.
F16L 3/00 (2006.01)
(52) U.S. Cl. .......................................... 248/49; 174/68.1
(58) Field of Classification Search .................. 248/49, 248/278.1, 276.1, 280.1, 282.1, 292.13; 174/68.1, 174/68.3, 60, 72 A, 72 R, 95, 96, 99 R
See application file for complete search history.

(56) References Cited

U.S. PATENT DOCUMENTS

| 3,761,603 | A | * | 9/1973 | Hays et al. ................... 174/101 |
| 3,895,178 | A | * | 7/1975 | Huibrechtse ................ 174/486 |
| 4,165,530 | A |   | 8/1979 | Sowden |
| 4,762,505 | A | * | 8/1988 | Asick et al. .................. 439/347 |
| 5,016,153 | A |   | 5/1991 | Gismondi et al. |
| 5,170,975 | A |   | 12/1992 | Chadwick |
| D334,439 | S |   | 3/1993 | Meyer et al. |
| 6,592,241 | B1 |   | 7/2003 | Kovacik et al. |
| 6,855,884 | B2 | * | 2/2005 | Spagnoli et al. ............. 174/507 |
| 6,972,367 | B2 | * | 12/2005 | Federspiel et al. .......... 174/481 |
| 7,059,574 | B2 | * | 6/2006 | Oddsen, Jr. ............ 248/280.11 |
| 7,060,901 | B2 | * | 6/2006 | Herzog et al. ................. 174/66 |
| 2005/0103517 | A1 | * | 5/2005 | Canepa ...................... 174/68.3 |
| 2005/0167143 | A1 | * | 8/2005 | Stempinski et al. ........ 174/68.3 |

* cited by examiner

Primary Examiner—Ramon O. Ramirez
(74) Attorney, Agent, or Firm—Cesari and McKenna, LLP

(57) ABSTRACT

An articulated hollow arm is disclosed. The arm has a hollow center with an opening along the length of the arm. The hollow accepts electrical wires or tubes or mechanical wires depending on the application. A removable top is inserted into the opening and is designed to be retained by the mechanical interference between the top and the edges of the opening. Flanges or grooves may be placed to accommodate such retention of the top. In addition an external clip or an end piece may be used to retain the top while allowing the wires, etc. to emerge from either end. Any termination or connector at the ends of the wires, etc. do not have to fit through the hollow. Such wires, etc. can be removed, repaired and/or replaced via the elongated opening by removing the top. The top may be of a flexible material that provides strain relief for any cables.

7 Claims, 2 Drawing Sheets

ARTICULATED CHANNEL ARM

CROSS-REFERENCE TO RELATED APPLICATIONS

The present application claims the benefit of U.S. Provisional Patent Application Ser. No. 60/505,298, which was filed on Sep. 23, 2003, by Richar L. May and entitled, Articulated Channel Arm, and which application is hereby incorporated herein by reference.

BACKGROUND OF THE INVENTION

1. Field of the Invention

The present invention relates to articulated arms used to position microphones, intravenous fluid bags, displays, lamps, magnifiers, cameras, and similar apparatuses, instruments and tools in a variety of locations.

2. Background Information

Articulated arms with springs and joints have been used for many years. For example, microphone booms, booms or holder for medical dispensing or other such purposes, and for large magnifiers with lighting have been used in industry for many years. Typically the joints in such arms incorporate a range of motions where the microphone (or other such apparatus being supported by the arm) can be positioned over a solid angle of nearly 360 degrees, and can be positioned near the base support for the arm or a distance from the base equal to the full extension of the arm.

One example of the limitations of prior art applications, electrical wires may run completely external to the supporting boom and be susceptible to damage or misuse. In another instance the wires need to be threaded through hollow tubes that form the structural parts of the arms. Such threading is inefficient and tends to preclude automation.

Often electrical (or other types) connectors are used with wires. When a boom supports a microphone and the electrical wires are threaded through the tube, the size of the connectors must be small enough to fit through the hollow in the arm to allow threading. In practice any connector must be much smaller that the tube inner diameter. The manufacturer has unattractive choices: to make the arms large enough to accommodate standard connectors, to buy special connectors small enough, or to use connectors that are larger than the hollow in the arm, and cannot be threaded therethrough.

Making the arms larger may be esthetically unattractive and therefore less appealing to the buyer. Making special connectors is expensive, and using larger connectors renders such assemblies difficult to service or repair. Making connections after the electrical wire is threaded through the arm may be practical during manufacturing but is not in the field. Replacing connectors in the field makes are unreliable and are not acceptable.

To accommodate the flexibility of the arm joints, wires threaded in the arms are looped at each joint to reduce strain.

As mentioned above, a limitation of prior art assemblies is servicing electrical wires, or other such wires or tubes, that are occasionally damaged in the field. In such an instance, the entire assembly needs to be disassembled and the wiring threaded through the hollowed arms. If the connectors do not fit through the hollow tube, they must be added in the field. As mentioned above, this repair task, if possible, is difficult, expensive and time consuming. Alternatively, the entire assembly may be replaced which is costly.

It is an object of the present invention to provide a more accessible means for replacing the electrical wires in such lamp assemblies and to provide an assembly that accommodates a wide variety of electrical connectors and wiring.

SUMMARY OF THE INVENTION

In view of the foregoing background discussion, the present invention provides a mechanical arm section having a hollow shaft suitable for supporting itself and cables within the hollow. An opening extending the length of the shaft permits the cables to be inserted into the hollow. Preferable the shaft is a U-channel and a top is made to interfering fit into the opening thereby securing the cables within the shaft.

The opening in the shaft might be shaped with a profile that mates to a matching profile in the portion of the top that extends into the opening. The mating mechanically acts to retain the top in place covering the opening. Alternatively, there may be matching grooves and fins or flanges in the sides of the top and the opening that interferingly mate with each other to secure the top in the opening.

Several of the inventive mechanical arm structures may be assembled with spring joints on a base to form a boom for supporting a microphone, fluid bag or other such device. Connectors at the base, between the arms and at the end distal from the base may be used to connect cables that run through the hollow shafts of the mechanical arm.

End pieces that fit into the ends of the hollow shafts, spring clips, pins or screws may be used as alternative device to secure a top in a shaft opening.

The top may be of a flexible material and the end piece may have a flexible portion. In a preferred embodiment the flexible material may contact and hold any cables within the hollow shaft to provide strain relief for the cables.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

FIG. 3 is a cross section of the top;

DETAILED DESCRIPTION OF AN ILLUSTRATIVE EMBODIMENT

Figure 1:
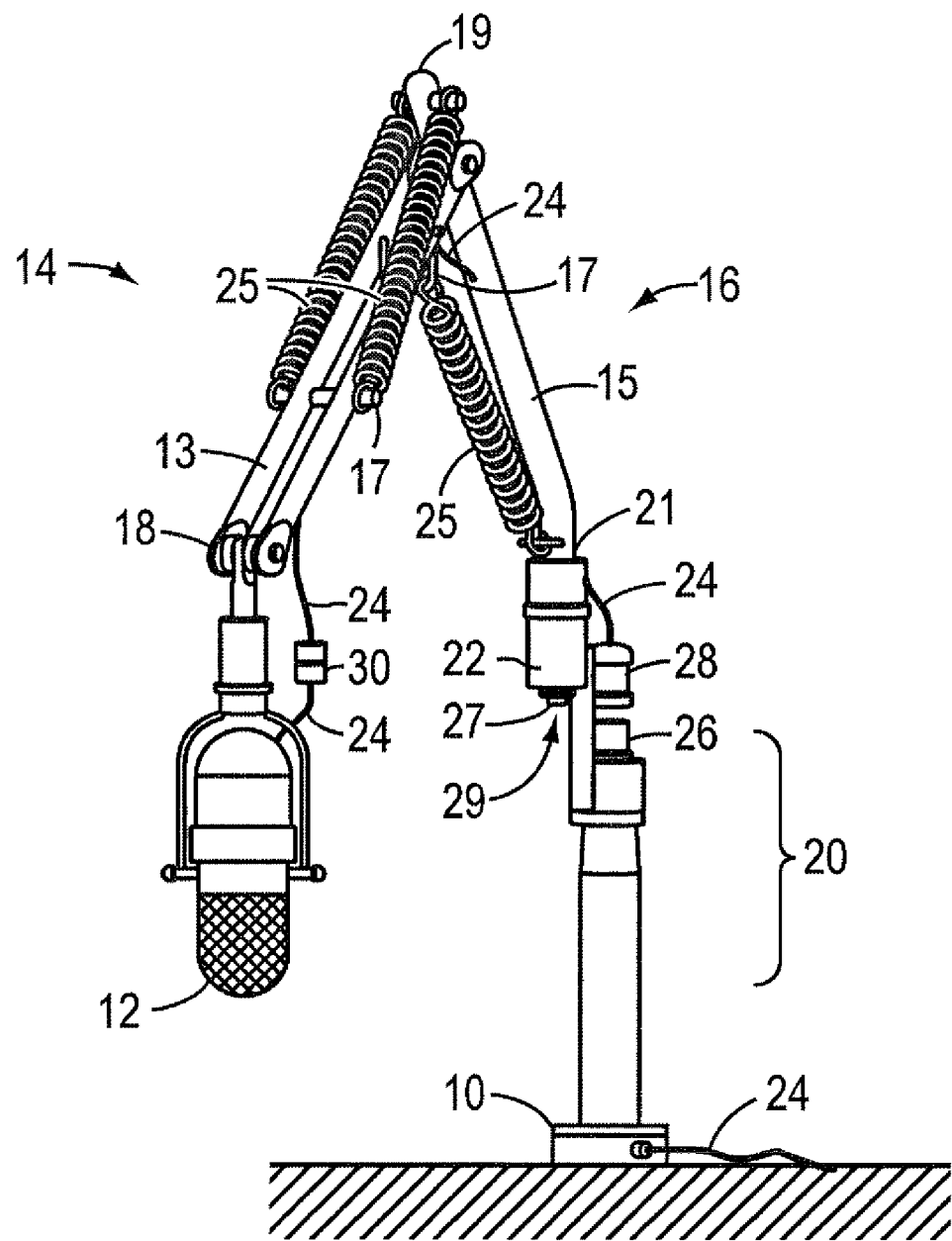
FIG. 1 is a pictorial of a microphone boom structure.

FIG. 1 shows a microphone flexible positioning boom example incorporating a preferred embodiment of the present invention. The microphone 12 is suspended from the end of two mechanical arm sections, 14, 16, that comprise an articulated boom. The joints 18, 19 and 21 are of a type well known in the art. The two arm section 14 and 16 assembly attaches to a stanchion or base 20 that is secured 10 to a bench, a larger boom or some supporting structure. The base has a mechanical female structure or fitting 22 which accepts a mating pin structure 27 at the end of the arm 16. There is an electrical wire 24 that feeds up through the hollow stanchion to an electrical connector 26. A mating connector 28 is threaded through hollow structures in both arms 14 and 16 and makes a dis-connectable electrical connection to the microphone 30.

In a preferred embodiment, the arm section 16 ends in a 1 inch pin 27 which fits into a mating structure 29 in the base, but this pin also mates into the conventional known clamping products which allows the assembly to be mounted to a variety of supports used in a variety of applications. For example, the present invention will find application as a boom holder in medical applications, in many industrial lighting and holding applications, and in security and surveillance applications.

In FIG. 1 arms 14 and 16 includes main supporting arms 13 and 15, discussed below, along with springs 25 and their supporting structures 17. The springs and their supporting structures, as known in the art, allow ease of positioning.

FIG. 1 hides the microphone wire improving the overall appearance of the microphone boom. Although hidden the wire is removed by removing the top from the U-channel. The base or stanchion, preferably, has an XLR female connector 26 at the top and enough wire extends from the base 24 to allow for a variety of electrical installations. The microphone wire ends in a mating XLR male connector 28 so that the connections to the microphone are entirely made within the boom—no external electrical connections need be made.

Figure 2:
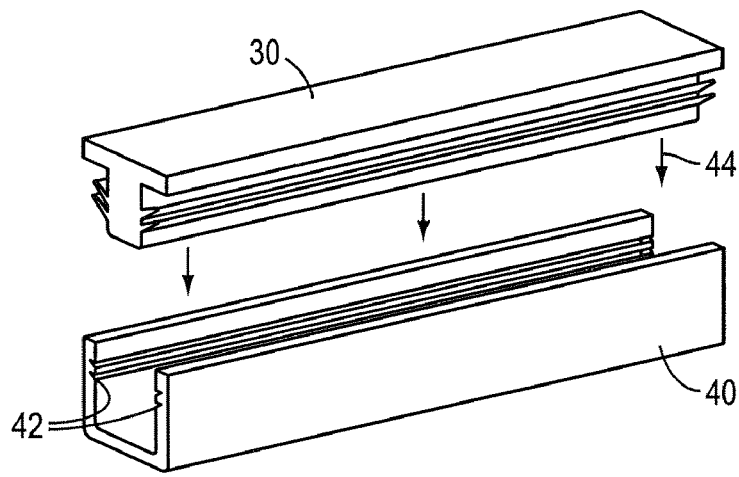
FIG. 2 is an isometric of an open channel arm and a removable top.

In a preferred embodiment of the present invention, arms 13 and 15 comprise U-channeled arm structures. FIG. 2 shows such a structure. However, a round, oval or other such shapes may be used to advantage in the present invention.

FIG. 2 shows a preferred U-channel main structural supporting element 40 of supporting arms 13 and 15. The U-channel is typically made of aluminum or steel, but other materials (plastic, rubber, wood, fiber, etc.) may be used that fit the particular applications. A flexible top 30 is formed to mate with the U-channel enclosing any wire positioned in the void (50 in FIG. 5) within the U-channel. The top may be placed above 44 the U-channel 40 and pushed into place or alternatively it may slide longitudinally into the U-channel. The top also may be of a variety of material, e.g. plastic, rubber, fiber, or a combination that complies with the mechanical flexibility and retention requirements of the top and the U-channel.

Figure 3:
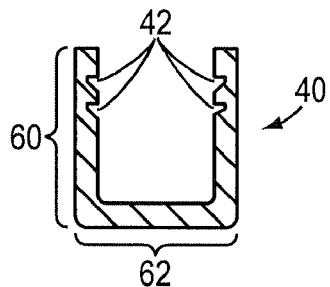
FIG. 3 is a cross section of the arm of FIG. 2.

FIG. 3 shows the U-channel in cross section. There are grooves 42 along the inner wall of the U-channel that run longitudinally along both sides of the U-channel. The grooves are oriented facing downward to accept and retain the top 30.

Figure 4:
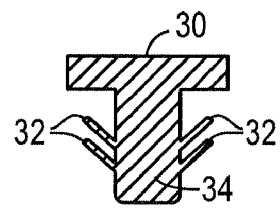
FIG. 4 shows the mating in cross section of the top and the channel arm.

FIG. 4 shows the top in cross section. The cap 30 is sized to cover the entire U-channel opening. There is an extension 34 from the cap, and there are flexible fins 32 that run longitudinally along the sides of the extension 34. The fins are upward facing and are thin enough to flex. The upward angle of the fins generally matches the down-ward facing grooves 42 with which the fins will ultimately mate as discussed below.

Figure 5:
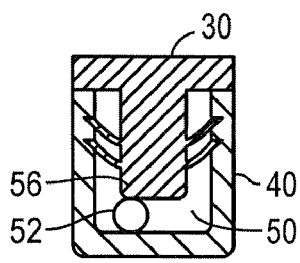
FIG. 5 is a cross section of the channel with the top secured therein.

FIG. 5 shows the mating of the top 30 and the U-channel 40. The top is positioned above the U-channel and snapped into place by pushing down on the top. The flexible flanges or fins 32 bend as they engage grooves 42 on the inner sides of the U-channel. There is a void 50 where the electrical wire or wires will run. The top 30 may be removed by sliding the top out longitudinally along the channel or the top may be pried up. The fins are designed to withstand the bending.

FIG. 5 shows a cable 52 in the hollow 50. In this preferred embodiment, the lower section 56 of the top 30 is made of a resilient material suitable for interferingly contacting the cable 52 and for securing the cable in the hollow. This occurrence acts as a strain relief on the cable 52 to prevent chafing and other damage to the cable within the hollow.

Figure 6:
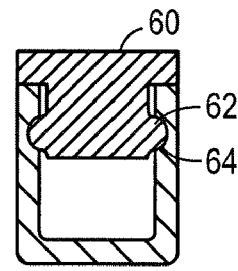
FIG. 6 is a cross section of an alternative mechanical structure of the channel with the top secured therein.

FIG. 6 shows an alternative mechanical arrangement to retain the top 60 with a lateral bulge 62 that is retained in a lateral groove 64 in the inner wall of the hollow.

Figure 7:
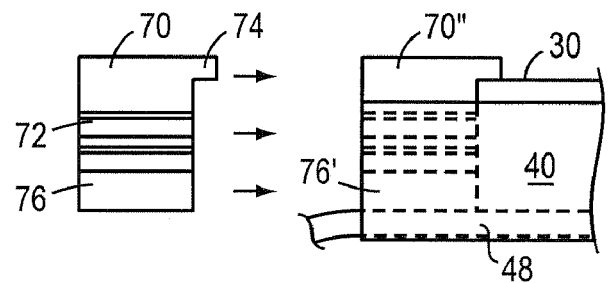
FIG. 7 is a side view composite of an end piece securing the top at the end of a channel.

In some applications there may be a separate end piece that interferingly fits into the U-channel that may or may not fit over the tops to secure them in place, or there may be other arrangements, as known in the art, to hold the tops in place. FIG. 7 is a side view composite of an end piece shown external 70 and inserted 70' with grooves or flanges 72 that fits into and engages the grooves in the inner surface of the U-channel 40. The end piece may have an extension 74 that retains the top piece 30.

FIG. 7 also illustrates a preferred embodiment for strain relief of the cable 78 as it leaves the hollow of the U-channel 40. The lower section 76 of the end piece may be of a resilient material that is compressed 76' when the end piece is inserted. This acts to hold the cable 78 in place and prevent chafing of the cable. In a preferred embodiment, the edges of the U-channel or other such shaft are chamfered so that the cable 78 encountered no sharp edges as it leaves the hollow. In a preferred embodiment, both the top and the end piece can provide strain relief for the cable 78. Other types of strain relieve could be used, for example a strap that surround the cable 78 and attached to itself with VELCRO™ or snap as known in the art.

Other mechanical arrangements to secure the top to the U-channel, for example a screw or a pin through the U-channel side that engages the top, would be known to those skilled in the art, for example, a spring clip over the top and around each side of the U-channel may be used.

In one preferred embodiment the base is of a height to accommodate low profile displays and speaker systems. In another preferred embodiment the void 50, FIG. 5, in the U-channel is sized to accommodate several microphone wires, and several mating connections may be installed at the top of the base 10.

Besides electrical wires, mechanical wires, fiber optical strands, flexible tubing for carrying gases or fluids may be placed or threaded through the void in the channel in other applications. The word "cable" is defined herein to encompass electrical, mechanical, optical and flexible tubing, and equivalents thereof.

As known in the art, the springs 25 are sized to hold the assembly with no wavering. Also, as known in the art the springs are of elastic music wire to limit the "crackle and twang" of ordinary steel springs as they move and flex. In preferred embodiments the springs may be coated or flocked as applications require.

In one preferred embodiment the arms 14 and 16 may be about 15 or 22 inches long. But other lengths may be used and the arms need not be of equal length. The U-channel external width 62 is about ½ inch, the height 60 about ⅝ inch and the metal thickness 64 about ⅛ of an inch. The top is proportionally sized to fit the U-channel, but leaving a void 50 of about ⅜ by 38 of an inch. As shown the microphone 12 may be positioned straight up at a 12 O'clock position or down to about a 7 O'clock position. For a microphone the arm may be designed for weights of one to twenty pounds, but the arms may be sized to accommodate weights of an ounce to tens of pounds or more.

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. A mechanical arm section comprising:
    an elongated hollow shaft suitable for supporting itself and supporting wires, cables or tubes within the hollow, the hollow shaft having an opening substantially along its length, the hollow shaft defining a first and second end,
    a top arranged to be removably inserted into the opening, however with the top inserted into the opening a passage remains along the length of the hollow shaft,
    means for holding the top within the opening, and
    an end piece that interferingly fits into the first end of the hollow shaft and provides access to the passage the top comprises an extension inserted into the opening to interferingly contact any wire, cable or tube to provide a strain relief.

2. The mechanical arm section of claim 1 wherein the top comprises a flexible body.

3. The mechanical arm section of claim 2 wherein the ends of the hollow shaft are chamfered to prevent chafing of any wire, or tube within the hollow that extends out from the passage.

4. The mechanical arm section of claim 1 wherein the extension has sides that contact the sides of the opening in the hollow shaft, wherein the portions of the extension that contact the opening has flanges, and wherein the portions of the opening in contact with the extension have mating grooves.

5. The mechanical arm section of claim 1 further comprising a spring clip that removably fit over the top and parts of the hollow structure to hold the top to the hollow structure.

6. The mechanical arm section of claim 1 wherein the end piece contacts and secures the top to the hollow shaft and interferingly contacts any wire, cable or tube exiting the passage to provide strain relief thereto.

7. An articulated boom comprising:
    two mechanical arm sections as defined in claim 1, each arm section having first and second ends,
    a base,
    a first connector fixed to the base,
    a first spring loaded swivel joint connecting the base to a first end of a first mechanical arm section,
    a second spring loaded swivel joint connecting the second end of the first mechanical arm to the first end of a second mechanical arm section,
    a cable positioned through the first and second mechanical arm sections,
    a first cable connector attached to an end of the cable at the base, wherein the first cable connector mates with the first connector,
    a second cable connector attached to the end of the cable at the second end of the second mechanical arm section.

* * * * *